No. 861,145. PATENTED JULY 23, 1907.
A. H. SISSON.
PASSENGER CAR CONSTRUCTION.
APPLICATION FILED OCT. 11, 1906.
7 SHEETS—SHEET 5.
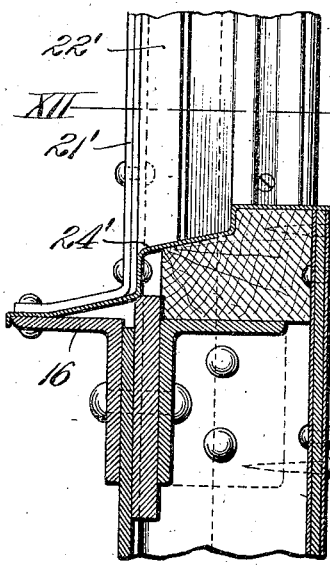
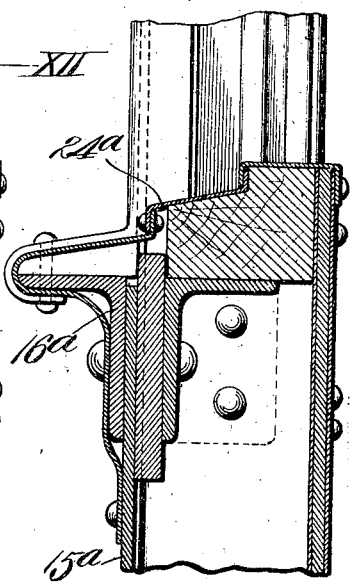
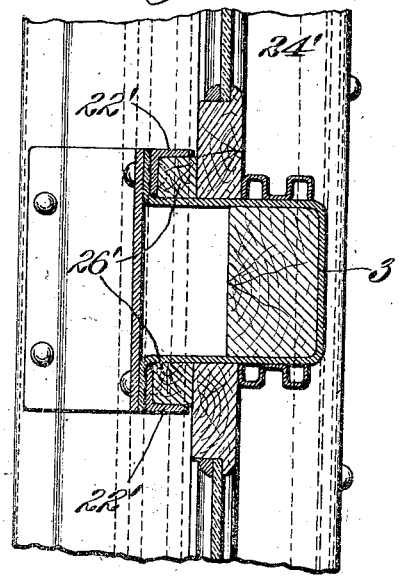

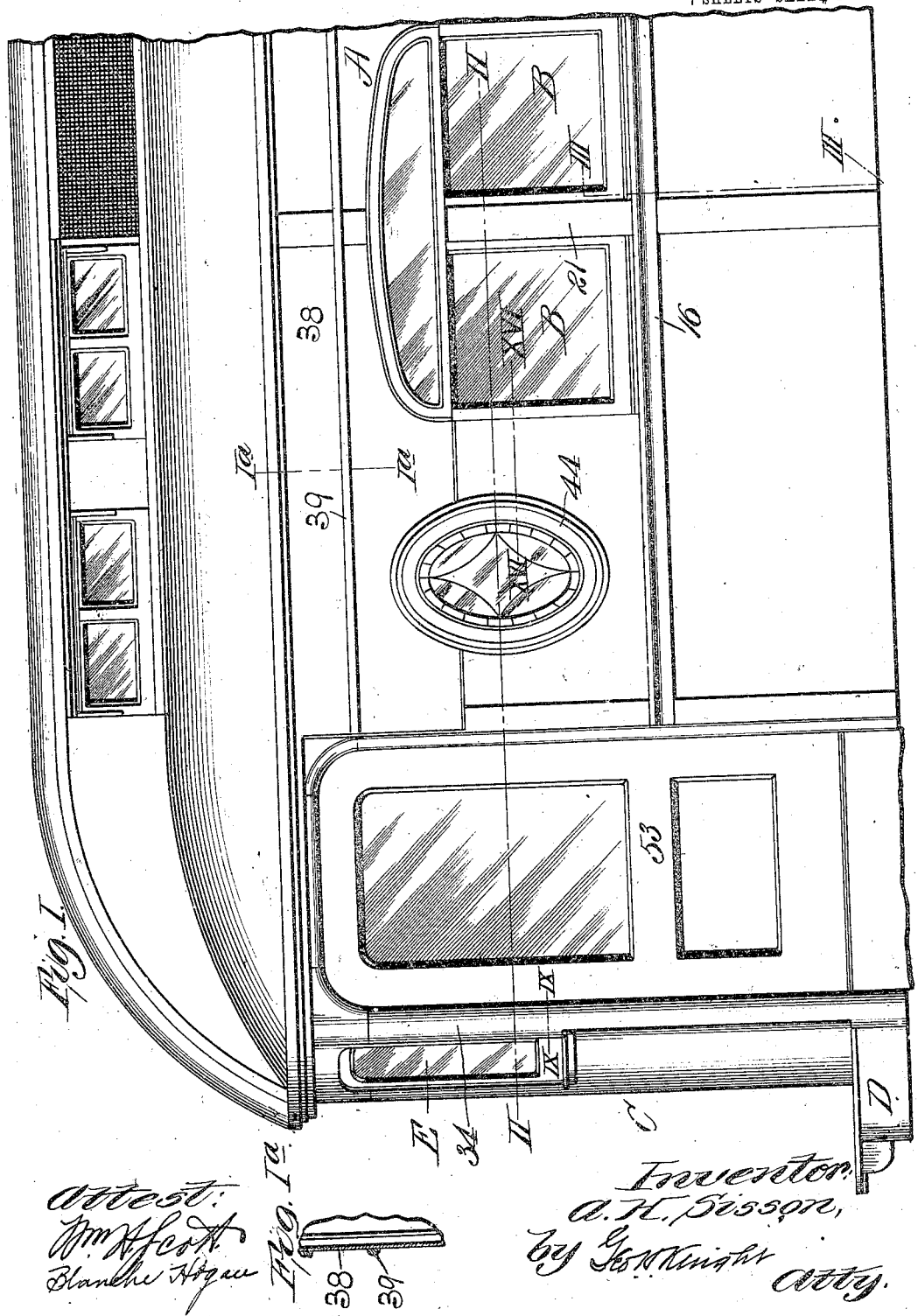

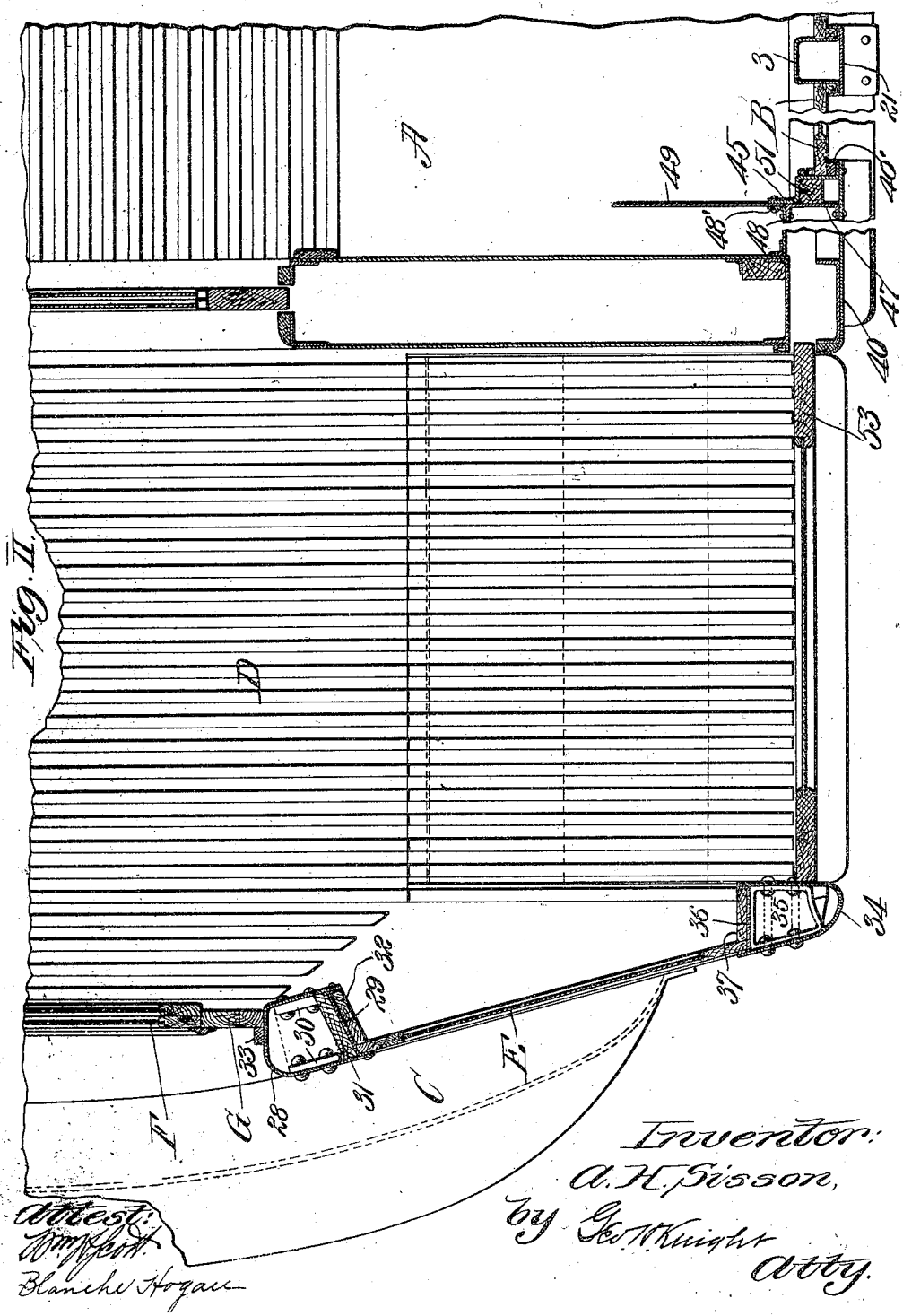

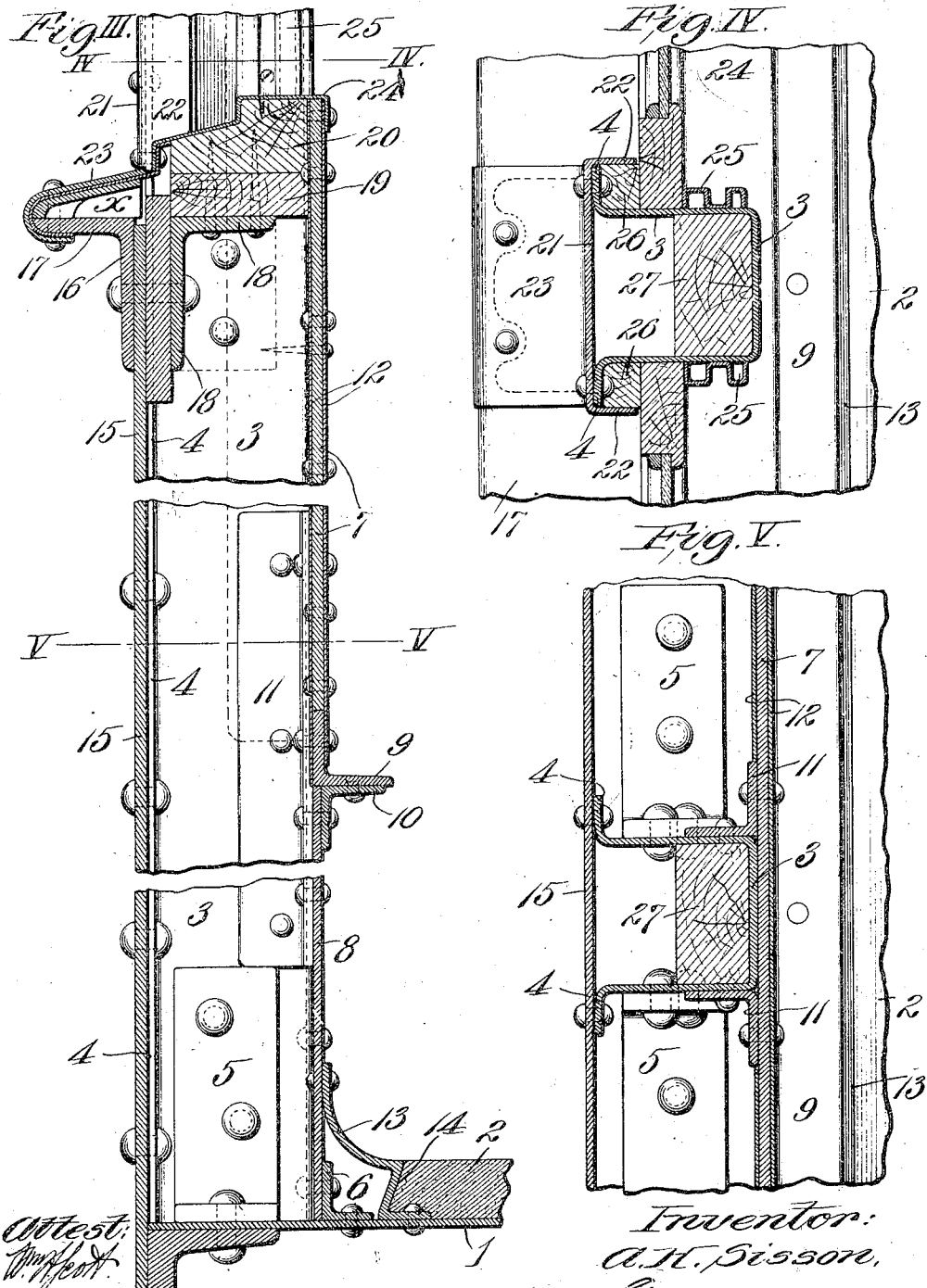

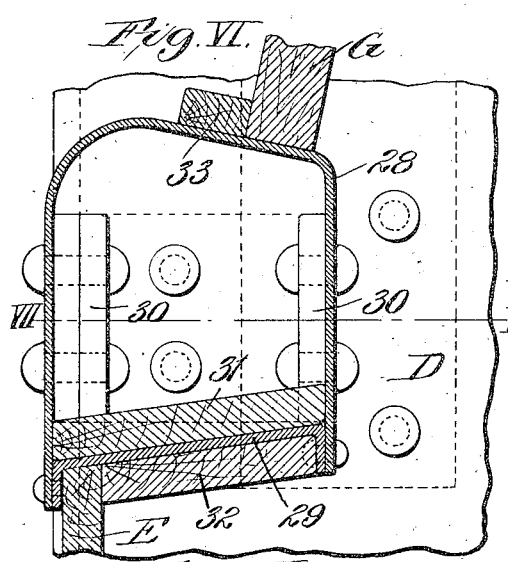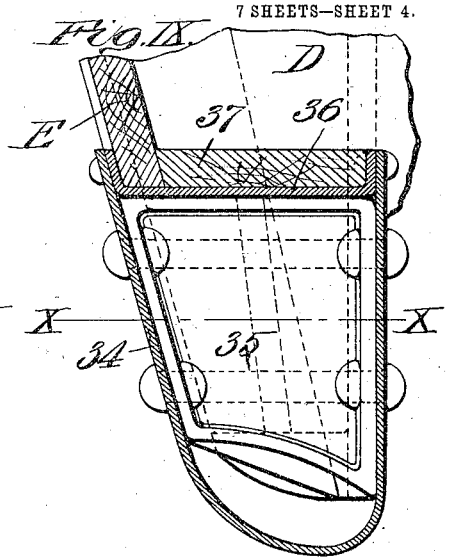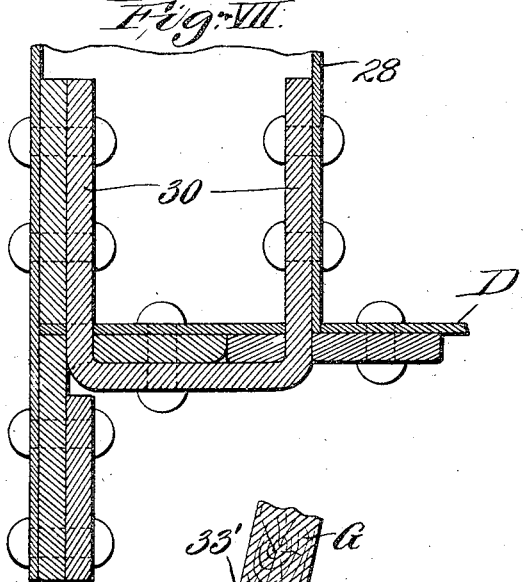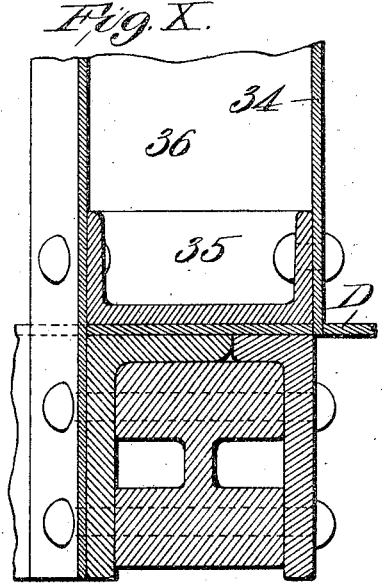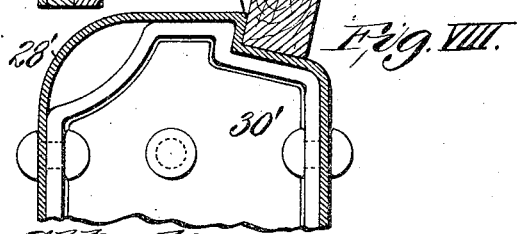

No. 861,145. PATENTED JULY 23, 1907.
A. H. SISSON.
PASSENGER CAR CONSTRUCTION.
APPLICATION FILED OCT. 11, 1906.
7 SHEETS—SHEET 6.
Fig. XIV
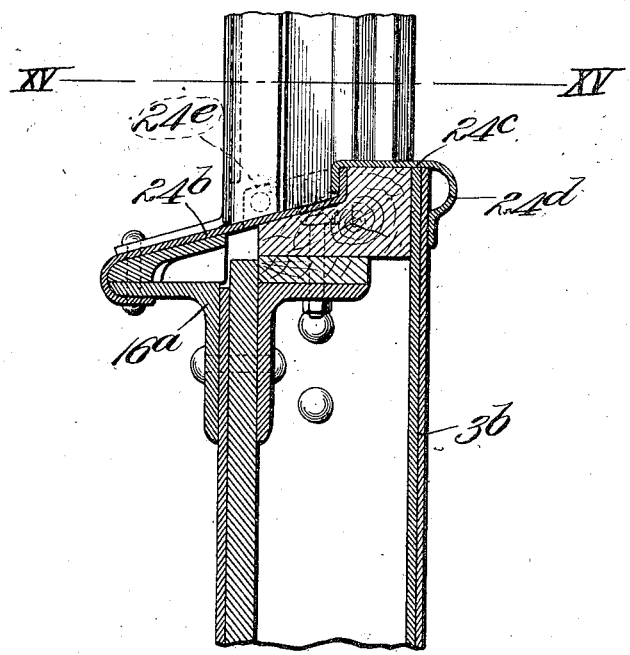
Fig. XV.
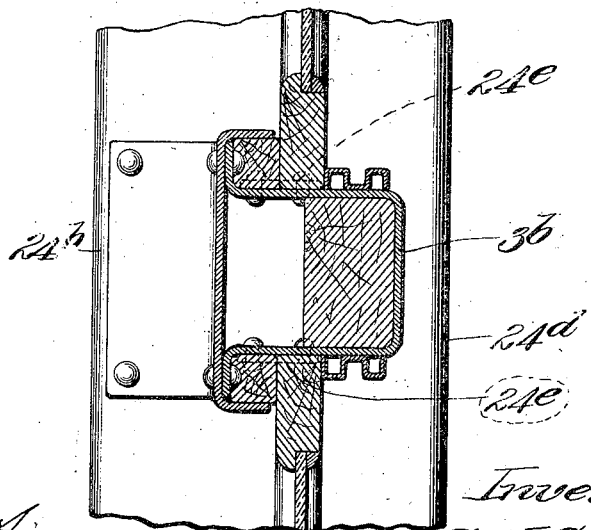

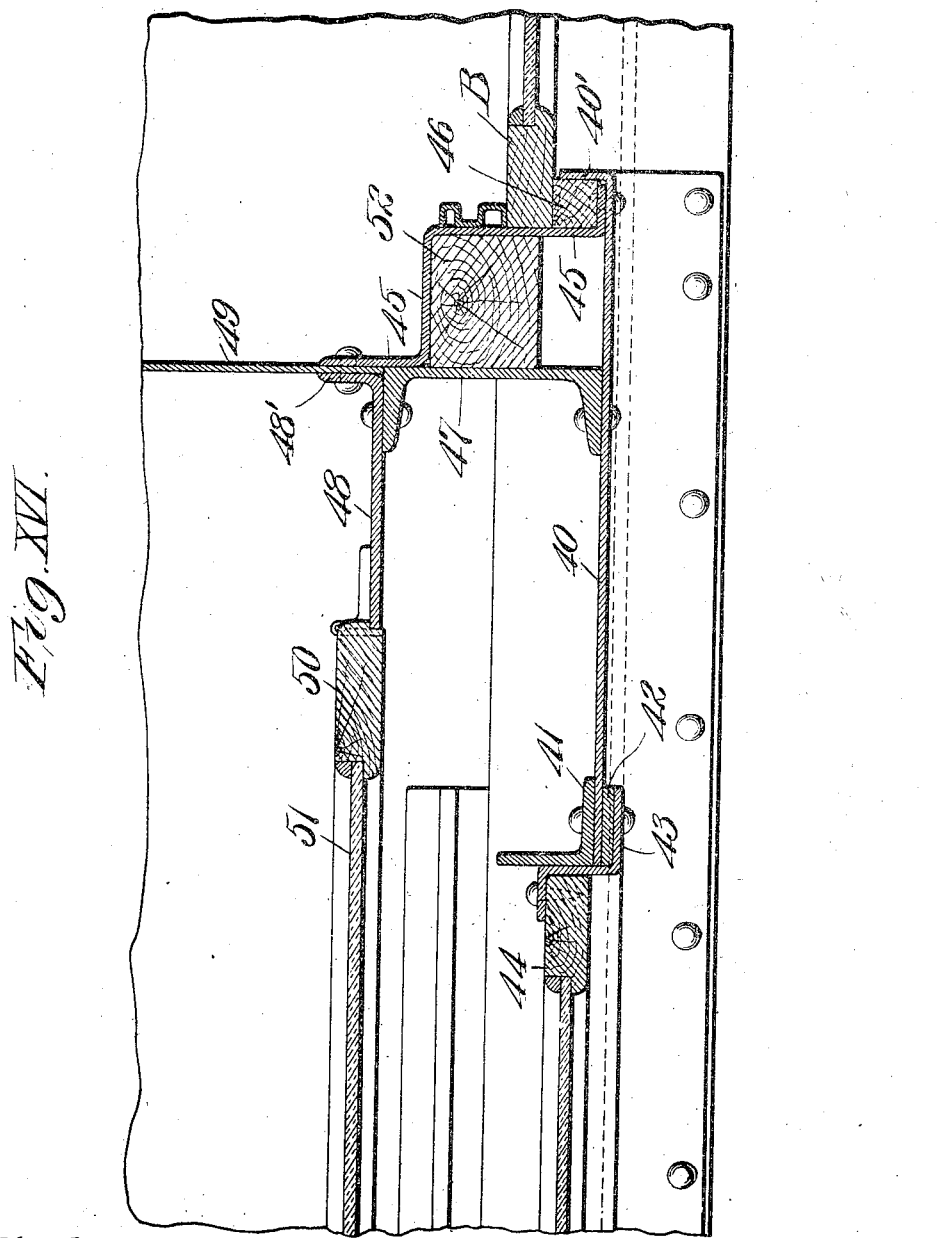

UNITED STATES PATENT OFFICE.

ALBERT H. SISSON, OF ST. LOUIS, MISSOURI, ASSIGNOR TO ST. LOUIS CAR COMPANY, OF ST. LOUIS, MISSOURI, A CORPORATION.

PASSENGER-CAR CONSTRUCTION.

No. 861,145.　　　　　　　　Specification of Letters Patent.　　　　　　Patented July 23, 1907.

Application filed October 11, 1906. Serial No. 338,390.

*To all whom it may concern:*

Be it known that I, ALBERT H. SISSON, a citizen of the United States of America, residing in the city of St. Louis and State of Missouri, have invented certain new and useful Improvements in Passenger-Car Constructions, of which the following is a full, clear, and exact description, reference being had to the accompanying drawings, forming part of this specification.

My invention relates to certain features of a passenger car and it has more particular reference to the side posts of the body of the car, the posts of the car vestibule, and the flooring of the car constructed of metal in lieu of wood with the object in view of securing rigidity and strength in these parts with least possible weight.

Figure I is a side elevation of a portion of my car at one end thereof. Fig. I$^a$ is a vertical section taken on line I$^a$—I$^a$, Fig. I. Fig. II is a horizontal section taken on line II—II, Fig. I with the side wall of the car partly broken out. Fig. III is an enlarged vertical section taken on line III—III, Fig. I. Fig. IV is a horizontal section taken on line IV—IV, Fig. III. Fig. V is a horizontal section taken on line V—V, Fig. III. Fig. VI is an enlarged horizontal section of one of the car vestibule center posts. Fig. VII is a vertical section taken on line VII—VII, Fig. VI. Fig. VIII is a view similar to Fig. VI illustrating a modification. Fig. IX is an enlarged horizontal section taken on line IX—IX, Fig. I, through one of the vestibule corner posts. Fig. X is a vertical section taken on line X—X, Fig. IX. Fig. XI is a vertical section similar to Fig. III and illustrating a modification of the structural features of the car in one of its side windows. Fig. XII is a horizontal section on line XII—XII, Fig. XI. Fig. XIII is a similar view to Figs. III and XI, illustrating another modification of the structural features in one of the car windows. Fig. XIV is a vertical section similar to Fig. III, illustrating another modification of the structural features of one of the side windows. Fig. XV is a horizontal section taken on line XV—XV, Fig. XIV. Fig. XVI is an enlarged horizontal section taken on line XVI—XVI, Fig. I.

A designates the body of my car containing side windows B.

C is the car vestibule having the platform D, the side window sashes E and center window sashes F, the latter of which are confined within window frames G.

1 designates the flooring bed of my car of metal and preferably of structural steel. This flooring bed which is supported by the sills of the car, seen most clearly in Fig. III, is surmounted by a concrete floor 2.

Located at intervals throughout the side of the car are side posts between which the car windows are positioned. These side posts are constructed in the main of pressed steel.

3 are pressed steel inner members of the side posts which are U-shape in cross section, the webs of the members being located at the interior of the car and the side wings of the members extending outwardly from said webs and terminating in laterally projecting flanges 4, as seen most clearly in Fig. IV. The main post members 3 are seated upon the flooring bed 1 and secured thereto by angle brackets 5 which are preferably riveted to the flooring bed and the wings of said post member. The post members are further secured to the flooring bed by angle foot rails 6.

7 and 8 designate respectively upper and lower pressed steel panel plates extending from end to end of the car at the interior thereof. These panel plates rest against the webs of the main post members 3 and they have interposed between them connecting angle rails 9 and 10 that are connected to each other and also connected to the plates by suitable means, such as rivets. The panel plates and their connecting angle rails are united to the main post members 3 by metal angle strips 11, each having one wing attached to the adjacent wing of a main post member. The upper panel plate 7 is inclosed between metal sheets 12 which extend below the lower edge of said panel plate and receive the upright wing of the connecting angle rail 9 to afford means for the attachment of said angle rail to said plate. 13 is a pressed steel wall base plate that extends longitudinally of the car. This base plate is secured to the webs of the main post members 3 and the foot portion of which is located inwardly toward the center of the car with respect to the side posts and secured to the flooring bed 1. Each base plate is provided with an outwardly inclining portion 14 to provide a tapering pocket for the concrete flooring 2 in order that said flooring may, when laid upon the flooring bed, be effectually held in place. The upper portion of each base plate is curved upwardly from the foot portion of the plate to provide a smooth and rounding surface above the floor level, thereby avoiding the presence of angular corners at the sides of the floor and making it possible to readily clean the entire car floor from side wall to side wall of the car.

15 designates pressed steel sheathing applied to the lower portions of the main side post members 3, the sheathing being preferably secured to said members by rivets which are inserted through the sheathing and the laterally projecting flanges 4 of the post members.

16 designates one of the belt rails of the car which are riveted or otherwise secured to the sheathing 15 at a point beneath the side window openings of the car. This belt rail is of angle form and has an outwardly projecting horizontal wing 17.

18 are angle rails located between the side post members 3 and which serve as supports for the window sill blocks 19 and 20, the latter of which are preferably of wood.

21 are cap plates which constitute the outer members of the upper portions of the side posts of the car. These cap plates are of pressed steel and they extend from the roof of the car to the sills of the side windows. Each cap plate is riveted or otherwise suitably secured to the lateral flanges of the main side post members 3 and has inturned flanges 22 that overlap the edges of the flanges 4 of the main side post members. At the lower end of which cap plate is an outwardly projecting clip extension 23 that extends above the flange 17 of the belt rail 16 and terminates beneath said flange. 24 is a window sill sheathing of sheet metal which is located within each side window of the car and extends across the upper sill block 20 and downwardly and outwardly therefrom to and beneath the plate rail flange 17. This sheathing, as illustrated in Fig. III, consists of two plates, the outermost plate being extended beneath the clip extensions 23 of the cap plates 21. For the purpose of upholding the outer sheathing plates in inclined position above the belt rail 16 I position on the belt rail at each window a supporting block $x$ of approximately triangular shape.

25 designates channel curtain guides which are applied to the wings of the main side post members 3 and which in addition to their utility as curtain guide members, constitute inner stops for the sashes of the side windows.

26 are outer non-metallic sash stops, which are confined between the wings of the main side post members and the flanges 22 of the cap plates 21. These stops 26 are preferably of wood in order that they may serve as sound deadening members in connection with the side posts and sashes.

27 are non-metallic filler strips located in the main side post members and adapted to serve as sound deadening members in connection with the side posts, these strips being also preferably of wood.

28, see particularly Figs. VI and VII, designates main post members of the center vestibule posts. These post members are of pressed steel and each member is of U-shape in cross section. Between the wings of these members are pressed steel stiffener plates 29 which are flanged, as seen in Fig. VI and are riveted or otherwise secured to the wings of the post members 28. Each post member 28 is seated upon the platform D of the car vestibule C and said member is secured to said platform by a U-shaped metal clip 30 which passes through the platform from its lower side and the arms of which are riveted or otherwise suitably secured to the wings of the post member 28.
31 and 32 are respectively inner and outer non-metallic sound deadening members, preferably of wood, which are applied to the center vestibule posts. The former of these members is located against the inside face of the stiffener plate 29 while the latter is located against the outside face of said plate and is of less width than the width of said plate. By thus making the last named member I provide a sash space between said member and the outermost flange of the stiffener plate 29 in which the side vestibule window sash E seats, as seen in Fig. VI. At the opposite side of each main vestibule center post member 28 and applied to the web of said member is a strip 33 preferably of wood to which the frame G of the center window sash F is attached.
In Fig. VIII, I have shown a modification of the center window post in which the separate strip 33 is dispensed with and a shoulder 33′ is formed in the web of the center post main member 28′ to take the place of the strip 33 as a bearing member for the sash frame G. I have also shown in this modification a flanged base casting 30′ which is adapted to be secured to the vestibule platform floor and to which the main vestibule center post member is attached, this casting being used in lieu of the U-shaped clip 30 previously described. 34 designates one of the main members of vestibule corner posts, these members being of pressed steel and being of U-shape in cross section. Each of the members 34 is mounted upon the vestibule platform and held thereto by trough shaped metal binding members 35 which are seated upon and secured to the platform and have the post members 34 attached thereto through the medium of rivets or other suitable means of fastening. 36 are flanged stiffener plates, of pressed steel, located between the wings of the main corner post members and connected to said wings, as seen most clearly in Fig. IX. 37 is a non-metallic sound deadening and sash stop member, preferably of wood, which is seated against the stiffener plate 36. The member 37 is of sufficiently less width than the stiffener plate 36 to provide a seat between the outermost edge of said member and the flange of said plate in which the side vestibule sash seats.

38 (see Figs. I and I$^a$) designates the letter board of my car and 39 is a molding bead located on said letter board and separating the letter space from the portion of the car wall beneath said letter space.

For the purpose of furnishing a toilet room in the car at one or both of its ends and also for the purpose of permitting the movement of a guard door for the platform of the car into a pocket, I provide the construction shown in Fig. XVI, which will now be described. 40 is an outer side wall plate that is located adjacent to an end of the car. The forward extremity of this wall plate is clamped between an inner vertical post 41, an outer binding strip 42 and a Z-shaped pressed steel window strip 43, the latter of which serves as a member for the attachment of the toilet room window 44. The wall plate 40 terminates at its rear end in a vertical inturned flange 40′ and this end of the plate has attached to it a zig-zag binding plate 45 between which and the flange 40′ is a wooden sound deadening and sash receiving strip 46 against which the adjacent side window B of the car rests. 47 is a channel shaped post that is attached to the wall plate 40 and the width of which extends transversely of the car. 48 is a partition wall plate attached to the channel post 47 and the zig-zag plate 45 and 49 is a toilet room wall that is secured between a flange 48′ of the partition plate 48 and the adjacent portion of the zig-zag plate 45. 50 is a window or door that is attached to the partition plate 48 and which preferably has a pane of glass 51 mounted therein, in order that the light from the exterior of the car may pass into the toilet room after passing through the window 44. 52 is a wooden sound deadening and stiffener member located between the zig-zag plate 45 and the channel post 47. 53 is a platform door (see Figs. I and II) that is adapted to be moved into the space between the parts 40, 41, 44 and 48 and 50, for the purpose of leaving the platform of the car unobstructed.

In Figs. XI and XII, I have shown a modification of the construction of parts of my car at the locations of the car side windows. In this modification the parts are similar to those previously described with the exception that the cap plates 21′ of the side window posts are unflanged and terminate above the belt rail 16 instead of being continued to a position beneath the belt rail. The window sill sheathing seat 24′ is made of a single piece instead of two pieces as previously described and the supporting block beneath said sheathing sheet is dispensed with. In this construction angle bars 22′ are secured to the flanges of the main side post members 3′ to serve as confining members for the sash stops 26′.

In the modification illustrated in Fig. XIII the parts associated with the side windows of the car are similar to those first described with the exception that the window sill sheathing 24$^a$ consists of three members instead of two members or a single member and the outermost member of the sheathing is continued over the belt rail 16$^a$ and downwardly past the lower edge of said rail and secured to the wall sheathing 15$^a$.

In Figs. XIV and XV, I have illustrated another modification of the structural parts of the side car window sills. In this modification the window sill sheathing is formed of two plates, an outer one 24$^b$ and an inner one 24$^c$, the outer plate being extended over the belt rail 16$^a$ and the inner plate being extended to the inside of the car and downwardly in the form of a bead 24$^d$ for the purpose of affording a more desirable finish at the window sill. The outer plate 24$^b$ is attached to the main side post members 3$^b$ located between each pair of windows by upturned flanges 24$^e$ that are preferably riveted to said post members as seen in dotted lines.

I claim:

1. In a car construction, the combination with a vestibule platform floor, of U-shaped pressed steel vestibule post members, and U-shaped clips extending upwardly through said vestibule platform and having their arms secured to said post members, substantially as set forth.

2. In a car construction, the combination of a metal channel post at one side of the car, a metal side wall plate secured to said channel post, a partition plate secured to said channel post, and a zig-zag plate connecting said wall plate and partition plate, substantially as set forth.

3. In a car construction, the combination of a metal channel post at one side of the car, a metal side wall plate secured to said channel post, a partition plate secured to said channel post, a zig-zag plate connecting said wall plate and partition plate, and a wooden sound deadening member located between said post and zig-zag plate, substantially as set forth.

4. A car having a metal floor, framing posts and base plates, each having an outwardly inclined portion to provide a tapering pocket for the filling.

5. A car having a metal floor, framing posts and base plates, each having an outwardly inclined portion to provide a tapering pocket, and a filling of concrete.

ALBERT H. SISSON.

In presence of—
ARTHUR DIEKMANN,
H. J. MURPHY.